Jan. 17, 1950

H. S. LENHART 2,494,887

SEAL FOR CONVEYING APPARATUS

Filed Feb. 12, 1946

Inventor
Herbert S. Lenhart
By Pennie Edmonds Morton Barrows
Attorneys

Jan. 17, 1950     H. S. LENHART     2,494,887
SEAL FOR CONVEYING APPARATUS
Filed Feb. 12, 1946     2 Sheets-Sheet 2
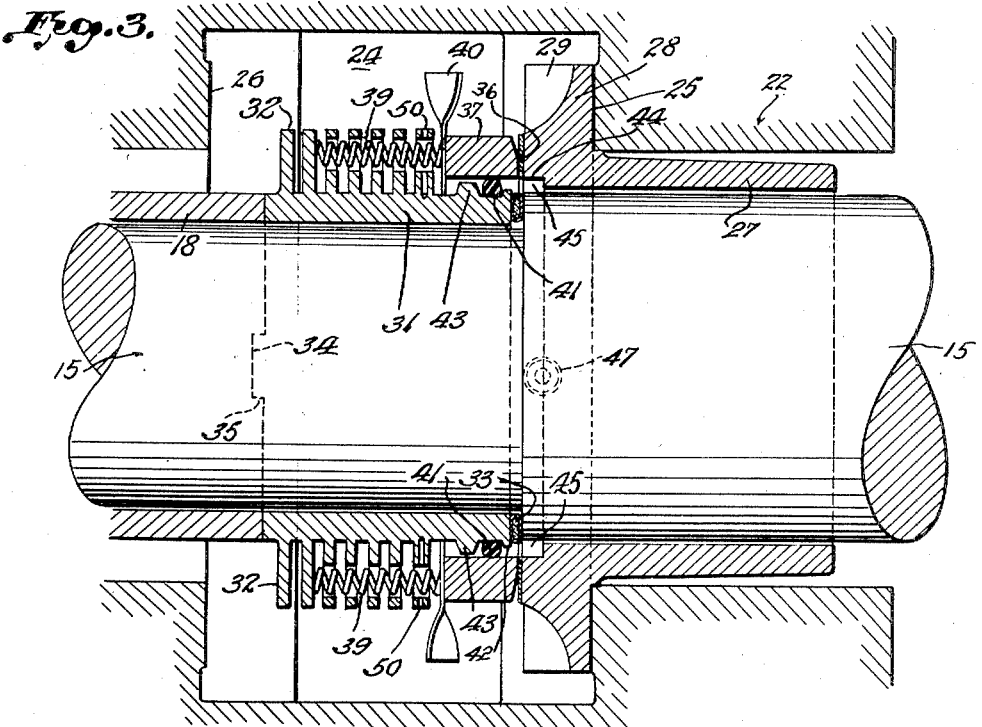
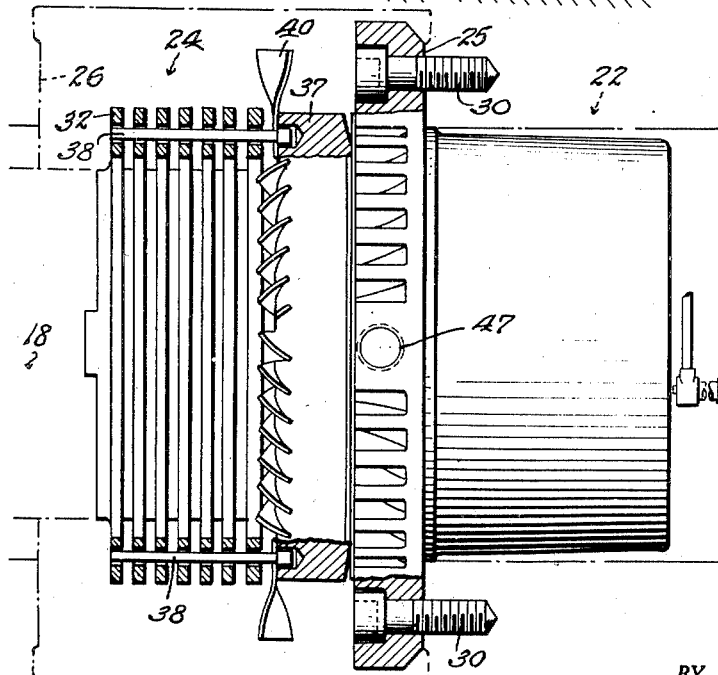
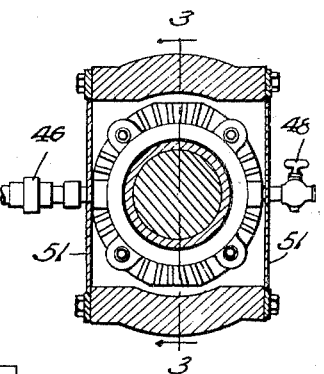
INVENTOR.
Herbert S. Lenhart
BY Pennie Edmonds Morton Barrows
ATTORNEYS Patented Jan. 17, 1950

2,494,887

UNITED STATES PATENT OFFICE 2,494,887

SEAL FOR CONVEYING APPARATUS

Herbert S. Lenhart, Allentown, Pa., assignor to Fuller Company, Catasauqua, Pa., a corporation of Delaware Application February 12, 1946, Serial No. 647,046

4 Claims. (Cl. 286—11.15)

This invention relates to devices for forming a seal between relatively moving parts and is concerned more particularly with a novel seal, which is air-cooled and self-lubricated, so that the seal has a long life and may be operated for long periods without attention. The new seal may be employed in apparatus of various kinds and may be utilized to especial advantage in apparatus for conveying pulverulent or finely divided material to prevent the escape of dust particles from the conveyor casing. In such conveying apparatus, the seal prevents wear on the shaft, bearings, and associated parts resulting from the abrasive action of the particles of material being conveyed, and the seal is thus particularly useful in conveyors handling such abrasive materials as Portland cement, pulverized limestone, flint, etc. As a form of the new seal for use in such conveying apparatus incorporates all the novel features of the invention, an embodiment of the invention suitable for use in apparatus for conveying pulverized materials, will be illustrated and described in detail for purposes of explanation.

In apparatus for conveying finely divided materials of an abrasive character, the lack of an air-tight seal between the relatively moving parts of the apparatus results in entrained grit or other dust particles passing the seal and entering the chamber housing the driving mechanism and associated parts. Bearings are particularly vulnerable to even small quantities of such abrasive material, and resulting wear necessitates frequent replacement under these conditions. The replacement of parts of such conveying apparatus, which are prematurely worn out, is in itself expensive, and the stoppage of the apparatus for repair frequently results in idleness of the entire plant, in which the conveying apparatus is used.

It has heretofore been proposed to seal the shaft of conveying apparatus adjacent the opening in the casing, through which the shaft passes, by mounting a metal seal ring on the shaft and pressing the ring into close sliding contact with a stationary metal seal ring encircling the shaft and secured to the casing. Such a construction is disclosed in Morrow Patent 2,000,293 and, in the Morrow seal, the movable seal ring has a circumferential channel, in which a packing ring is seated in contact with the shaft. The spring acts on the packing ring and the pressure of the spring causes the packing ring to engage the shaft and the seal ring to cause the latter to rotate with the shaft. In this type of seal, lubrication of the contacting surfaces of the seal ring is necessary and the device includes an oil reservoir containing a quantity of oil, into which the moving seal ring dips. It is, accordingly, necessary to provide a second seal on the shaft to prevent the escape of oil along the shaft from the reservoir and the seal first described is duplicated, with a single spring acting on the movable seal rings of both seals. Experience with seals of this type has shown that, if the seal rings are so formed that the necessary film may be maintained between them, air from the conveyor casing will also enter the space between the rings and carry with it entrained dust.

The present invention is, accordingly, directed to the provision of a simple seal for use between a stationary member, such as a casing, and a rotary member, such as a shaft, which projects through an opening in the casing. The seal includes a self-lubricated seal ring carried by and rotating with the shaft and spring-pressed into sealing contact with a seal ring fast on the casing. The rotary seal ring is supported on the shaft by a resilient element, which not only permits limited axial and radial movement of the ring but also seals the space between the ring and shaft. Air may, accordingly, be admitted into the space around the shaft at the side of the resilient element adjacent the stationary seal ring and the air cools the seal rings and escapes along the shaft through the stationary seal ring to prevent access of dust particles to the contacting surfaces of the rings.

For a better understanding of the invention, reference may be had to the accompanying drawings which are to be taken as illustrative and not as limiting and in which:

Fig. 2 is a sectional elevation taken on lines 2—2 of Fig. 1;

Fig. 3 is a vertical sectional elevational taken on line 3—3 of Fig. 2;

Fig. 4 is a side elevation of the seal structure with part broken away for purpose of illustration.

Figure 1:
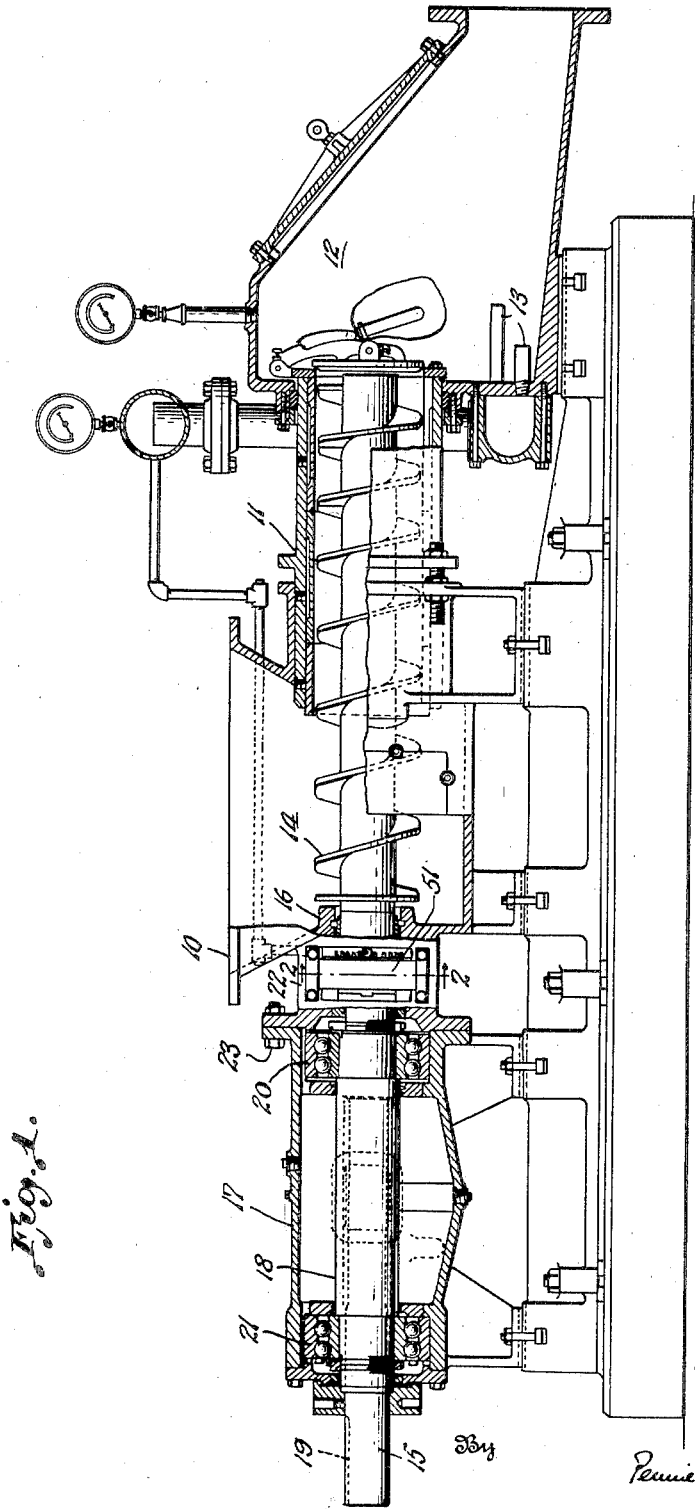
Fig. 1 is a side elevation, partly in section, of a stationary pump, for dry pulverized material.

The conveying apparatus illustrated in the drawings comprises a hopper 10, adapted to receive the material to be conveyed from any desired source of supply. A barrel section 11, opening into the front wall of the hopper, terminates in an aerating chamber 12 to which air is admitted through nozzles 13. The material is advanced through the hopper and barrel by means of an impeller screw 14, the shaft 15 of which passes through the rear wall 16 of the hopper and is supported in a bearing structure indicated generally at 17.

The shaft bearing assembly includes a relatively long bushing 18, through which the shaft extends, the portion of the shaft projecting beyond the bushing being provided with a keyway 19 whereby it may be coupled with a prime mover (not shown). The bushing turns with the shaft and is carried by spaced bearings 20 and 21 within the bearing assembly. The hopper is provided with an extension 22 beyond its rear wall 16, and the extension is suitably flanged and secured as by bolts 23 to the bearing assembly 17. Within the extension is a chamber 24 having a front wall 25 and a rear wall 26 between which is disposed the seal device constituting the subject matter of the present invention.

The shaft opening in the rear wall of the hopper is provided with a short renewable bushing 27 having a radial flange 28. Cooling ribs 29 are provided on the flange 28 and the entire bushing may be cast integrally of a common grade of cast iron if desired. The bushing 27 is secured by bolts 30 with the forward face of flange 28 in contact with the front wall 25 of chamber 24. The inner diameter of bushing is about 1/32 of an inch greater than the diameter of shaft 15, so that there is a passage through the bushing for a counter-current of compressed air, which flows forwardly along the shaft into the hopper 10, to prevent the rearward movement of dust particles.

Slightly to the rear of wall 25, the screw shaft 15 is reduced in diameter to form a shoulder, and a short bushing 31, having a plurality of radial spaced fins 32, is mounted on the part of the shaft of reduced diameter and sealed against the shoulder by means of a compressible gasket 33. The short bushing is provided with a key 34 entering a key-seat 35 in the forward end of the bushing 18, so that the short bushing will rotate with the shaft.

The rear end of flange 28 has a radial surface 36, which is given a smooth finish, and if desired, may be plated with chromium or other wear-resisting material. An annular seal ring 37 of self-lubricating material is carried by the collar 31 and rotates therewith and ring 37 bears against surface 36 on flange 28 to form an airtight joint between these two relatively moving parts. Under operating conditions, the rotating shaft, upon which the seal ring 37 is supported in a manner to be later explained, is subject to slight oscillations and end movements, which have resulted in failure to maintain the seal in many of the prior devices accordingly, to insure an air-tight joint, between the seal ring 37 and the surface 36 under all conditions, the seal ring 37 is mounted in a manner to permit limited axial and radial movement independent of the shaft. The seal ring is caused to rotate with the shaft by circumferentially spaced pins 38 which have their head portions embedded in the seal ring, the pins extending into suitable aligned openings in the vanes 32. The aligned openings are of slightly greater diameter than the diameter of the pins to permit limited radial movement. The forwardly positioned vanes 32 are provided with a second set of aligned circumferentially spaced openings in which are positioned compression springs 39 adapted to press the seal ring 37 against the surface 36 under all operating conditions, these aligned openings also having a slightly greater diameter than the springs to permit radial movement of the seal ring. Heat generated within the seal ring 37 is dissipated, in part, by the fan 40 positioned adjacent the ring and supported by the pins 38. This fan is constructed of heat-conducting material, such as copper, and upon rotation of the shaft causes a steady flow of air within the chamber 24.

To permit the independent movement of the seal ring, its inner diameter is substantially greater than the outside diameter of the base portion of the collar 31, and the ring is supported by a packing 41 of resilient material encircling the collar. The packing 41, which may be of rubber, comprises a continuous annular member, circular in cross-section, and is under slight radial compression when in operative position, thus forming a seal between the two members. The packing 41 is free to roll in relation to the seal ring 37 and collar 31 upon oscillation or endwise movement of the shaft, this free rolling movement greatly reducing the wear during operation. Longitudinal movement of the packing 41 is limited in one direction by a raised lip 42, and in the other direction by the annular projection 43, both of which may be cast integrally with the collar 31.

Under certain conditions, the oscillation of the shaft may be of such magnitude as to cause a radial movement of the collar 31 within the seal ring 37 sufficient to break the joint between the packing 41 and the inner surface of the seal ring 37. To insure that the space sealed by the packing 41 does not exceed, at any point, slightly less than the relaxed diameter of the packing, such relative radial movement of the collar and seal ring is limited by the annular projection 43 which causes the seal ring to slide radially on the surface 36 to maintain the proper relationship of seal parts for all conditions of radial shaft movement.

The packing 41 together with the seal ring 37, the walls of the enlarged bore 44 of the bushing 27, and the collar 31 form an annular chamber 45, which is in communication with the hopper through the annular space between the bushing 27 and the shaft. A conduit 46 directs a steady flow of compressed air to the chamber 45 through opening 47 provided in the bushing 27. As the only outlet from the chamber is along the shaft in the direction of the hopper, a steady flow in this direction is maintained, and any foreign matter seeking its way rearwardly is carried away. To test the air flow to the annular chamber 45 during operation of the device, an air outlet valve 48 is provided, this outlet valve communicating with the chamber 45 at the side opposite to the conduit 46.

To facilitate the placing of the seal assembly on the shaft, radial holes 50, communicating with the openings for the springs 39, are provided in the forward vane 32 whereby the springs may be held in a retracted position by pins (not shown) during assembly of the various bushings, bearings, etc., the pins being removed after completion of the assembly. Cover plates 51 secured to the hopper casing partially close the chamber 24 on opposite sides and prevent accidental contacts with the rotating parts.

From the foregoing it will be seen that a seal of maximum simplicity is thus provided, free from all contaminating fluids or abrasive material, which is not subject to periodic lubrication and inspection.

I claim:

1. A seal device for sealing an opening in the wall of a casing, which comprises a shaft extending through the opening, a bushing extending through the opening and loosely encircling the shaft, the bushing having a flange lying against and secured to the wall of the casing around the opening, the flange having a sealing face, a bushing closely encircling the shaft outside the casing and rotating with the shaft, a seal ring loosely encircling the rotary bushing, means connecting the seal ring to the rotary bushing to rotate therewith, spring means pressing the seal ring along the shaft to make sealing contact with the sealing face on the flange, a ring of resilient material closely encircling the rotary bushing and supporting the seal ring thereon for limited axial and radial movement relative thereto, and circumferential flanges on the rotary bushing within the seal ring and radially spaced therefrom, said flanges lying on opposite sides of the resilient ring to limit movement thereof lengthwise of the bushing and also radial movement of the seal ring relative to the rotary bushing.

2. A seal device for sealing an opening in the wall of a casing, which comprises a shaft extending through the opening, a bushing extending through the opening and loosely encircling the shaft, the bushing having a flange lying against and secured to the wall of the casing around the opening, the flange having a sealing face, a bushing closely encircling the shaft outside the casing and rotating with the shaft, a seal ring loosely encircling the rotary bushing, means connecting the seal ring to the rotary bushing to rotate therewith, spring means pressing the seal ring along the shaft to make sealing contact with the sealing face on the flange, resilient means between the seal ring and the rotary bushing for sealing therebetween and supporting the seal ring on the bushing for limited relative axial and radial movement, and at least one fan blade on the rotary bushing rotating therewith to circulate air around the outside of the seal ring and flange.

3. A seal device for sealing an opening in the wall of a casing, which comprises a shaft extending through the opening, a bushing extending through the opening and loosely encircling the shaft, the bushing having a flange lying against and secured to the wall of the casing around the opening, the flange having a sealing face, a bushing closely encircling the shaft outside the casing and rotating with the shaft, a seal ring loosely encircling the rotary bushing, means connecting the seal ring to the rotary bushing to rotate therewith, spring means engaging the rotary bushing and seal ring and pressing the latter along the shaft to make sealing contact with the sealing face on the flange, a ring of substantially impervious resilient material closely encircling the rotary bushing and supporting the seal ring thereon for limited relative axial and radial movement, fan blades mounted on the rotary bushing for circulating air around the outside of the seal ring and flange, and means for introducing air under pressure within the seal ring and flange to escape along the shaft through the bushing secured to the casing wall.

4. A seal device for sealing an opening in the wall of a casing, which comprises a shaft extending through the opening, a bushing extending through the opening and loosely encircling the shaft, the bushing having a flange lying against and secured to the wall of the casing around the opening, the flange having a sealing face, a bushing closely encircling the shaft outside the casing and rotating with the shaft, a seal ring of self-lubricated material loosely encircling the rotary bushing, means connecting the seal ring to the rotary bushing to rotate therewith, spring means pressing the seal ring along the shaft to make sealing contact with the sealing face on the flange, a ring of resilient material closely encircling the rotary bushing and supporting the seal ring thereon for limited axial and radial movement thereto, and circumferential flanges on the rotary bushing within the seal ring and radially spaced therefrom, said flanges lying on opposite sides of the resilient ring to limit movement thereof lengthwise of the bushing and also radial movement of the seal ring relative to the rotary bushing.

HERBERT S. LENHART.

REFERENCES CITED

The following references are of record in the file of this patent:

UNITED STATES PATENTS

| Number | Name | Date |
| --- | --- | --- |
| 1,859,436 | Durdin | May 24, 1932 |
| 1,905,618 | Bodart | Apr. 25, 1933 |
| 2,000,293 | Morrow | May 7, 1935 |
| 2,020,436 | Shenton | Nov. 12, 1935 |
| 2,362,854 | Stephens | Nov. 14, 1944 |
| 2,370,964 | Janette | Mar. 6, 1945 |
| 2,411,509 | Endebak | Nov. 26, 1946 |

Certificate of Correction

Patent No. 2,494,887 January 17, 1950

HERBERT S. LENHART

It is hereby certified that errors appear in the printed specification of the above numbered patent requiring correction as follows:

Column 2, line 42, for the word "elevational" read *elevation*; column 3, line 58, for "devices accordingly" read *devices. Accordingly*; column 6, line 33, before "thereto" insert *relative*;

and that the said Letters Patent should be read with these corrections therein that the same may conform to the record of the case in the Patent Office.

Signed and sealed this 23rd day of May, A. D. 1950.

[SEAL]

THOMAS F. MURPHY,
*Assistant Commissioner of Patents.*